(12) United States Patent
Fancher

(10) Patent No.: US 7,298,451 B2
(45) Date of Patent: Nov. 20, 2007

(54) METHOD FOR PRESERVATION OF MOTION PICTURE FILM

(75) Inventor: James Arthur Fancher, Marina del Rey, CA (US)

(73) Assignee: Thomson Licensing, Boulogne (FR)

( * ) Notice: Subject to any disclaimer, the term of this patent is extended or adjusted under 35 U.S.C. 154(b) by 342 days.

(21) Appl. No.: 11/150,630

(22) Filed: Jun. 10, 2005

(65) Prior Publication Data

US 2006/0280379 A1 Dec. 14, 2006

(51) Int. Cl.
*G03B 19/18* (2006.01)
*G06K 9/54* (2006.01)

(52) U.S. Cl. ........................................ 352/38; 382/305
(58) Field of Classification Search ................. 352/38, 352/44; 382/276, 293, 305; 358/302, 515, 358/518
See application file for complete search history.

(56) References Cited

U.S. PATENT DOCUMENTS

| 5,329,383 | A | * | 7/1994 | Collette ...................... 358/500 |
| 5,499,044 | A | * | 3/1996 | Collette ...................... 347/232 |
| 7,110,605 | B2 | * | 9/2006 | Marcellin et al. ........... 382/232 |
| 2006/0023275 | A1 | * | 2/2006 | Feiner et al. ............... 358/527 |

* cited by examiner

*Primary Examiner*—Rodney Fuller
(74) *Attorney, Agent, or Firm*—Joseph J. Laks; Robert B. Levy

(57) ABSTRACT

A method for archiving a motion picture film can include capturing in a digital format at least one reference image set corresponding to at least one image from the motion picture film. At least one reference image set can be created which includes an unprocessed image captured, in the digital format, from an original camera negative. The image set can also include a processed image, stored in said digital format, that is a modified version of the unprocessed image. Subsequently, the reference image set can be recorded on a reference film medium to form a key frame reel. The key frame reel can thereafter be used to create monochrome color separations.

21 Claims, 1 Drawing Sheet

METHOD FOR PRESERVATION OF MOTION PICTURE FILM

FIELD OF THE INVENTION

The present invention generally relates to motion picture film, and more particularly to methods for preserving the artistic intent, as embodied in the production process, and the full quality of the original recorded image material.

BACKGROUND OF THE INVENTION

The process for creating motion pictures is continually evolving. One of the more recent developments involves what is commonly referred to as a digital intermediate process ("DI process"). In general, the DI process involves the temporary conversion of film to a digital format for the production and editing process. When this process is complete, the motion picture is recorded from the digital format back to film again. The process for converting the original film to digital format can vary. However, current technology will typically scan film at a resolution of 2 K (2048×1556) and 10 bits per color channel. Although this level of resolution is currently deemed acceptable for release, it does not capture all of the information on the film negative. With the improvement in technology, the scanning resolution and color bit depth is expected to improve.

With current technology and economic considerations, the DI process does not take advantage of the full image quality of the original camera negative (OCN) or other image acquisition medium. Therefore, archiving the post production film created after the DI process is complete does not preserve the full image quality that is available. In contrast, archiving the OCN or other image acquisition medium can preserve the original image quality. However, archiving the original OCN material does not preserve the artistic intent as embodied in the production process and release. One solution might be to archive both the post production film created after DI and the OCN. However, archiving both sets of materials is expensive Film material is best archived by making three monochrome separations that capture the content of the Yellow, Cyan and Magenta (YCM) layers of the OCN. Such archives are believed to have a viable life of around 500 years. Separations are usually made from "timed" intermediates, with some image quality loss. Alternatively, the separations can be made using the timing information to create separations from the OCN, in which case artistic intent is preserved. There are advantages to creating separations from the OCN using "nominal" exposure values and no printing-light correction so as to capture the full dynamic range of the OCN. This approach ensures that no image information is lost. However, the creation of separations using this technique does not convey any information about how the negative was timed and printed. The result is a loss of information regarding color correction and so on. Accordingly, this information regarding the original release is not preserved. Consequently, the artistic intent of the director may be lost.

One known technique for providing a color-correction reference for the full length timed print of a motion picture involves use of a "key frame reel" or "trial print". The key frame reel normally contains three frames (first, middle, last) for each scene, to provide a color correction reference for making the full-length timed print. The longevity of the InterPostive (IP) obtained using this process is estimated at about 150 years. However, the IP is known to degrade continuously. Consequently, the key frame reel does not provide a reference for preserving artistic intent that has the longevity of OCN monochrome separations.

SUMMARY OF THE INVENTION

The present invention concerns a method for archiving a motion picture film. The method is designed to preserve the highest image quality available, while also capturing the artistic intent of the director or other creative entity involved with the film. The method for archiving motion pictures can include several steps.

A first step in the process can include creating a plurality of monochrome separations that capture the content of the Yellow, Cyan, and Magenta layers of the original camera negatives from which the motion picture has been created. A second step in the method can include creating a key frame film reel from the digital intermediate process.

The creation of the key frame film reel can include (i) capturing in a digital format a plurality of reference image sets corresponding to a plurality of images from a beginning portion, middle portion and end portion of each scene of the motion picture film; (ii) selecting the reference image sets to each include an unprocessed image captured in the digital format from an original camera negative, and a processed image that is a modified version of the unprocessed image; and (iii) recording the reference image sets on a film medium. Notably, the processed images can include images that have been modified with color correction, pan and scan moves, and effects shots inserted. Metadata can also be recorded in the reference film media. For example, the metadata can include information useful for recreating the artistic intent of the film such as frame counts, original camera negative keycodes, information concerning the resizing and positioning data, and special effects data.

After the key frame reel has been created, monochrome separations can be made from the key frame film reel. The monochrome separations separately capture the content of one or more of the yellow, cyan and magenta layers for the reference image sets.

The method can include a further step of recording narrative information concerning the artistic intentions of at least one creative entity associated with the creation of the motion picture. For example, the creative entity can be a person such as a director or a director of photography of the motion picture. The artistic intentions can include a variety of factors such as desired color correction and lighting preferences for particular scenes. The narrative can be created and/or recorded in an unstructured conversational format. For example, the narrative can be created while the artistic entity views each of the identified scenes of the motion picture. The narrative can be recorded as text, audio format or any other convenient method.

The invention also concerns a motion picture archive product. The product includes a plurality of monochrome separations that capture the content of the yellow, cyan, and magenta layers of the original camera negatives from which a motion picture has been created. It also contains a key frame film reel comprising a plurality of reference image sets. The reference image sets include at least one unprocessed image from each of a plurality of scenes of the motion picture film and captured on film from a digital intermediate data format. The reference image sets also include a processed image that is a version of the unprocessed image that has been modified in the digital intermediate process before being captured on film. The product also includes a plurality of monochrome separations produced from the key frame film reel that separately capture the content of one or more of a yellow, cyan and magenta layer for the reference image sets. The motion picture archive product can also include metadata recorded in the key frame film reel. The metadata can include frame counts, original camera negative keycodes, resizing and positioning data, and/or special effects data.

According to one aspect of the invention, at least three reference image sets can be provided on the key frame reel for each of the plurality of scenes of the motion picture. Further, the three or more reference image sets can be respectively from a beginning portion, an end portion and a middle portion of each of the scenes. Finally, narrative information can be recorded on a recording medium. The narrative information can contain information concerning the artistic intentions of one or more creative entity associated with the creation of the motion picture.

BRIEF DESCRIPTION OF THE DRAWINGS

Preferred embodiments of the present invention will be described below in more detail, with reference to the accompanying drawings, in which.

DETAILED DESCRIPTION

Figure 1:
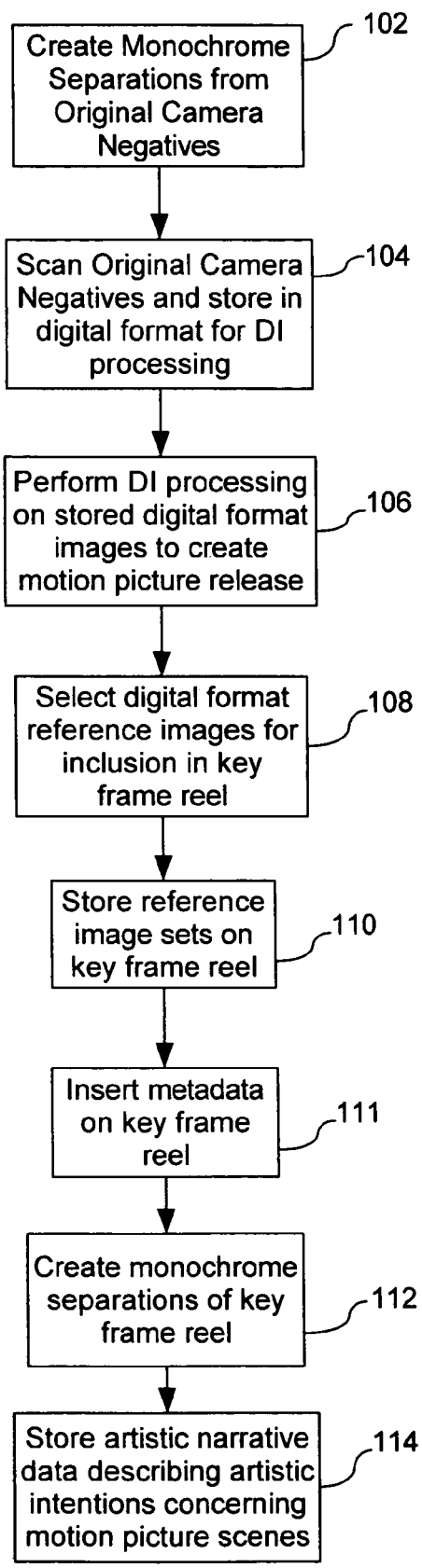
FIG. 1 is a flow chart that is useful for understanding the present invention.

The simplest way to archive the result of a digital intermediate (DI) process would be to store the Yellow, Cyan and Magenta (YCM) layers from the film-out from the DI process. Film is and should remain, until proven obsolete, the preferred archival medium. However, the film-out from the DI process is by definition highly dependent on the limitations of the technologies currently employed in that process. Presently, 2 k resolution is available today. However, much higher resolutions are anticipated for the future. Today's technology will always be trailing tomorrow's technology and from this standpoint, any element archived today out of the DI process, will lack significant resolution when compared to the technologies available in a few years. Even a 4 k-based archive today may not be relevant in the eyes of content owners 50 years from now, when 12 k-res-holographic representation is the norm.

The need for archiving arises both from the necessity to preserve the assets created today in their current format but also from the need to be able to repurpose/reformat those assets when new distribution formats are prevalent. It is possible to re-master content in high definition (HD) format today because (i) the current archival format (film) has more intrinsic resolution than HD and (ii) some transfer technologies (telecine) exist that can take advantage of the higher resolution. Still, it is a highly risky exercise to try to predict today what will be the distribution formats of the years to come. In that context, the best archival strategy is the one that stores the original elements in their highest resolution available to allow for future reformatting.

The present invention provides a method for archiving a motion picture film. The process described herein is designed to preserve the highest image quality available, while also capturing the artistic intent of the director or other creative entity involved with the film. FIG. 1 is a flowchart that is useful for understanding the method for archiving motion pictures according to an embodiment of the invention.

Referring now to FIG. 1, the process can begin with the original camera negatives. More specifically, in step 102, a plurality of monochrome separations can be made that capture the content of the yellow, cyan, and magenta layers of the original camera negatives from which the motion picture has been created. A variety of techniques are available for creating monochrome separations, as is well known in the art. For example, the separations can be formed on modern silver image material which is independent of the any dye images. This is an important feature of color separations because dyes can often be subject to fading and distortion. Sometimes polyester base materials are used for producing the monochrome separations. More often however, modern acetate based film stocks are used for this purpose. These monochrome separation images permit long term accurate preservation of color images as they were created on the original camera negative. However, they do not provide an archive of color correction or modifications to the images that are performed after the original camera negative has been recorded.

In step 104, the original camera negatives can be scanned and stored in a conventional digital format used for DI processing. The digital intermediate (DI) process is commonly used in the motion picture industry to convert original camera negatives to a finished motion picture film. The DI process involves temporary conversion of film to a digital format for production and editing. Typically, the original camera negative is scanned to create an electronic file of unprocessed digital format images. A variety of digital formats are used for this purpose. However, the particular format used is not crucial to the present invention, provided that the selected format faithfully creates a digital representation of the original image.

Once the digital format images have been captured in the scanning process, they can be manipulated and/or modified by technical specialists based on artisitic input by a motion picture director or director of photography. Such manipulations or modification can include color correction, resizing, framing, addition of special effects and so on. Ultimately, the modified images are edited to form a completed film. In step 106, DI processing can be performed in the conventional manner on the stored digital format images using conventional techniques to create a motion picture that is ready for release.

A key frame reel can be created beginning in step 108. In step 108, a plurality of digital format reference pictures from the motion picture can be selected for inclusion in the key frame reel. Thereafter, in step 110, a key frame film reel can be created as part of the digital intermediate process.

The key frame reel can include one or more reference image sets. Each reference image set can be based on an image from the motion picture film. The reference image set can advantageously include at least two images. A first image of the reference image set can be an unprocessed version of an image captured in the digital format from the original camera negative. A second image of the reference image set can be a processed image in the digital format that is a version of the first image that has been modified in the course of the DI processing. Thereafter, the reference image set can be converted from digital format to a film medium to create the key frame reel. The film recording step can be performed using conventional techniques for printing a motion picture from a digital intermediate.

A single reference image set based on a single image from the motion picture can provide some information regarding the original DI. However, the pertinent information thus captured can be incomplete relative to the overall motion picture. The DI processing, lighting, and a variety of other factors can vary from scene to scene, and even within a particular scene. Consequently, in accordance with a preferred embodiment of the invention, a plurality of reference image sets can be created. The plurality of reference image sets can correspond to a plurality of images from a plurality of scenes in a movie. For example, the plurality of reference image sets can be based on images selected from a beginning portion, middle portion and end portion of each scene of the motion picture film. Still, those skilled in the art will appreciate that the invention is not limited to any particular selection of images for the purpose of creating the reference image set. All that is necessary is that the selection of images be chosen to provide a colorist in the future with sufficient information from each scene to recreate a DI for substantially the entire motion picture. Significantly, the digital intermediate thus created can be faithful to the original digital intermediate.

As noted above, one image of the reference image set can be an unprocessed image captured in the digital format from the original camera negative whereas the second image of the reference image set can be a processed image. The processed image is advantageously selected to be a version of the unprocessed image that has been modified in the course of the DI processing. Notably, the processed images can include digital format images that have been modified in any way as part of the DI process. Examples of such modification can include color correction, pan and scan moves, and effects shots. However, the invention is not limited in this regard. Instead, those skilled in the art will readily appreciate that the processed images for the reference image set can contain other modifications as well.

In step 111, metadata can be recorded in the reference film media as part of the key frame reel. The term metadata as used herein refers to any useful information that relates directly or indirectly to the manner in which an original scanned image has been modified in the course of the DI process. Metadata can include any information useful for recreating the artistic intent of the film such as timing, lighting, frame counts, original camera negative keycodes, information concerning the panning, scanning, resizing and positioning of images, and special effects data. Still, the invention is not limited in this regard and any other metadata can be recorded as part of the key frame reel. Metadata can be recorded at any convenient location on the key frame reel. For example, the data can be recorded on the edge of the film, between frames, or on additional frames.

After the key frame reel has been created, monochrome separations can be made from the key frame reel film media in step 112. The monochrome separations separately capture the content of one or more of the yellow, cyan and magenta layers for the reference image sets recorded on the key frame reel. The monochrome separation process is well known in the art and therefore shall not be discussed here in detail. It is sufficient to note that the monochrome separations using conventional techniques permit the original color images recorded on the key frame reel to be accurately archived for future use.

The method shown in FIG. 1 can include a further step 114 which includes recording narrative information concerning the artistic intentions of at least one creative entity associated with the creation of the motion picture. According to one aspect of the invention, the creative entity can be a person such as a director or a director of photography of the motion picture. However, the invention is not limited in this regard and any other artistic entity can record such narrative information to archive their artistic intent associated with the original motion picture release. Those skilled in the art will appreciate that artistic intentions can include a variety of factors that affect the look and feel of a motion picture. For example, artistic intention can include desired color correction and lighting preferences for particular scenes. Still, the invention is not limited in this regard and any other aspects of the creative process can be recorded as part of the narrative.

The narrative can be created and/or recorded in an unstructured conversational format. For example, the narrative can be created while the artistic entity views each of the identified scenes of the motion picture. Alternatively, a more structured format can be used, provided that it accurately conveys the intent of the artistic entity in relation to one or more scenes of the motion picture. The narrative can be recorded as text, audio format or any other convenient method. If recorded as audio, it can be useful for the narrative to include some means to correspond the information conveyed with particular scenes of the motion picture. For example, the audio information can include specific references to the scene being discussed. Alternatively, video images or text information can be used to identify the particular scene which is the subject of the artistic entity's comments.

While the foregoing description is directed to the preferred embodiment of the present invention, other and further embodiments of the invention may be devised without departing from the basic scope thereof. Accordingly, the scope of the present invention should be determined by the claims that follow.

The invention claimed is:

1. A method for archiving a motion picture film comprising the steps of:
   capturing in a digital format at least one reference image set corresponding to at least one image from said motion picture film;
   selecting said at least one reference image set to include an unprocessed image captured in said digital format from an original camera negative, and a processed image that is a modified version of said unprocessed image; and
   recording said at least one reference image set on a reference film medium.

2. The method of claim 1, further comprising capturing a plurality of said reference image sets, each set based on an image contained in a respective one of a plurality of scenes of said motion pictures.

3. The method of claim 2, further comprising capturing at least three reference image set for each of said plurality of scenes of said motion picture.

4. The method of claim 3, further comprising selecting said images upon which said at least three reference image sets are respectively based from a beginning portion, an end portion and a middle portion of each of said scenes.

5. The method according to claim 1, further comprising creating a plurality of monochrome separations from said film medium that separately capture the content of at least one of a yellow, cyan and magenta layers for said reference images.

6. The method according to claim 1, further comprising recording narrative information concerning the artistic intentions of at least one creative entity.

7. The method according to claim 6, further comprising selecting said creative entity from the group consisting of a director and a director of photography of said motion picture.

8. The method according to claim 6, further comprising selecting said artistic intentions from the group consisting of color correction and lighting preferences for particular scenes.

9. The method according to claim 6, further comprising recording said narrative in an unstructured conversational audio format while said artistic entity views each of a plurality of identified scenes of said motion picture.

10. The method according to claim 1, further comprising selecting said processed image to include images that have been modified with color correction, pan and scan moves, and effects shots inserted.

11. The method according to claim 1, further comprising creating a plurality of monochrome separations that capture the content of the Yellow, Cyan, and Magenta layers of the original camera negatives from which the motion picture has been created.

12. The method of claim 1, further comprising recording metadata in said reference film media, said metadata selected from the group consisting of frame counts, original camera negative keycodes, resizing and positioning data, and special effects data.

13. A method for archiving motion pictures, comprising:
(a) creating a plurality of monochrome separations that capture the content of the Yellow, Cyan, and Magenta layers of the original camera negatives from which the motion picture has been created;
(b) creating a key frame film reel by:
  (i) capturing in a digital format at least one reference image set corresponding to at least one image from each scene said motion picture film;
  (ii) selecting said at least one reference image set to include an unprocessed image captured in said digital format from an original camera negative, and a processed image that is a modified version of said unprocessed image; and
  (iii) recording said at least one reference image set on a film medium; and
(c) creating a plurality of monochrome separations from said key frame film reel that separately capture the content of at least one of a yellow, cyan and magenta layers for said reference image sets.

14. The method of claim 13, further comprising recording metadata in said key frame film reel, said metadata selected from the group consisting of frame counts, original camera negative keycodes, resizing and positioning data, and special effects data.

15. The method according to claim 13, further comprising recording narrative information concerning the artistic intentions of at least one creative entity associated with the creation of said motion picture in an unstructured conversational audio format while said artistic entity views each of a plurality of identified scenes of said motion picture.

16. A method for archiving motion pictures, comprising:
(a) creating a plurality of monochrome separations that capture the content of the Yellow, Cyan, and Magenta layers of the original camera negatives from which the motion picture has been created;
(b) creating a key frame film reel by:
  (i) capturing in a digital format a plurality of reference image sets corresponding to a plurality of images from a beginning portion, middle portion and end portion of each scene of said motion picture film;
  (ii) selecting said plurality of reference image sets to each include an unprocessed image captured in said digital format from an original camera negative, and a processed image that is a modified version of said unprocessed image; and
  (iii) recording said plurality of reference image sets on a film medium; and
(c) creating a plurality of monochrome separations from said key frame film reel that separately capture the content of at least one of a yellow, cyan and magenta layers for said reference image sets.

17. A motion picture archive product, comprising:
(a) a plurality of monochrome separations that capture the content of the Yellow, Cyan, and Magenta layers of the original camera negatives from which a motion picture has been created;
(b) a key frame film reel comprising a plurality of reference image sets, said reference image sets comprising:
  (i) at least one unprocessed image from each of a plurality of scenes of said motion picture film and captured on film from a digital intermediate data format; and a processed image that is a version of said unprocessed image that has been modified in the digital intermediate process before being captured on film; and
(c) a plurality of monochrome separations produced from said key frame film reel that separately capture the content of at least one of a yellow, cyan and magenta layers for said reference image sets.

18. The motion picture archive product according to claim 17, further comprising metadata recorded in said key frame film reel, said metadata selected from the group consisting of frame counts, original camera negative keycodes, resizing and positioning data, and special effects data.

19. The motion picture archive product according to claim 17, wherein at least three reference image sets are provided on said key frame reel for each of said plurality of scenes of said motion picture.

20. The motion picture archive product according to claim 18, wherein said images upon which said at least three reference image sets are respectively from a beginning portion, an end portion and a middle portion of each of said scenes.

21. The motion picture archive product according to claim 17, further comprising narrative information recorded on a recording medium and containing information concerning the artistic intentions of at least one creative entity associated with the creation of said motion picture.

* * * * *